US010218306B2

(12) United States Patent
Ash et al.

(10) Patent No.: US 10,218,306 B2
(45) Date of Patent: Feb. 26, 2019

(54) APPARATUS FOR SECURING A SOLAR PANEL RAIL GUIDE TO A SUPPORT BRACKET (71) Applicant: Ironridge, Inc., Hayward, CA (US)

(72) Inventors: Jon Ash, Phoenix, AZ (US); David Taggart, San Carlos, CA (US)

(73) Assignee: Ironridge, Inc., Hayward, CA (US)

( * ) Notice: Subject to any disclaimer, the term of this patent is extended or adjusted under 35 U.S.C. 154(b) by 0 days.

(21) Appl. No.: 15/730,807

(22) Filed: Oct. 12, 2017

(65) Prior Publication Data

US 2018/0062571 A1 Mar. 1, 2018

Related U.S. Application Data (63) Continuation-in-part of application No. 15/252,676, filed on Aug. 31, 2016, now Pat. No. 9,819,303.

(60) Provisional application No. 62/212,449, filed on Aug. 31, 2015.

(51) Int. Cl.
*F16B 39/32* (2006.01)
*H02S 30/10* (2014.01)
*H02S 20/23* (2014.01)
*H01R 4/34* (2006.01)
*H01R 4/30* (2006.01)
*H02S 40/36* (2014.01)
*F24S 25/61* (2018.01)

(52) U.S. Cl.
CPC .............. *H02S 30/10* (2014.12); *F16B 39/32* (2013.01); *F24S 25/61* (2018.05); *H01R 4/305* (2013.01); *H01R 4/34* (2013.01); *H02S 20/23* (2014.12); *H02S 40/36* (2014.12); *Y02B 10/12* (2013.01); *Y02B 10/20* (2013.01); *Y02E 10/47* (2013.01)

(58) Field of Classification Search
CPC ... H02S 30/10; F24J 2/46; F16B 39/24; F16B 39/282; F16B 39/32
USPC ......................................................... 411/190
See application file for complete search history.

(56) References Cited

U.S. PATENT DOCUMENTS 2,696,139 A 12/1954 Attwood
3,483,910 A 12/1969 LaLonde
3,605,845 A 9/1971 Junker
(Continued)

FOREIGN PATENT DOCUMENTS

GB 191502015 10/1915
GB 1592275 7/1981

*Primary Examiner* — Beth A Stephan
(74) *Attorney, Agent, or Firm* — Lance C. Venable; Law Office of Lance C. Venable, PLLC (57) ABSTRACT In various representative aspects, an assembly for securing a support bracket to rail guide used for mounting and installing solar panels is provided. More specifically, the assembly provides a novel and improved nut with a serrated surface in combination with a t-bolt with a serrated surface that is capable of penetrating the respective oxidation surface layers of the bracket and the rail guide when installed. When installed, provides a mechanism for using the bracket to connect the rail guide to a flashing that is typically installed on a roof. An alternate embodiment of the nut also includes rotational and vertical stabilizing features that prevent the nut from moving along the bracket once it is secured. By employing the apparatus at various locations along the roof in a linear fashion, the rail support structure can be properly installed so that an array of solar panel modules to be installed.

20 Claims, 11 Drawing Sheets

(56) References Cited

U.S. PATENT DOCUMENTS

| | | | |
|---|---|---|---|
| 4,189,976 A | 2/1980 | Becker | |
| 4,267,870 A | 5/1981 | Warner | |
| 4,391,546 A | 7/1983 | Lyon | |
| 4,657,459 A | 4/1987 | Landt | |
| 4,830,531 A | 5/1989 | Condit et al. | |
| 5,190,423 A * | 3/1993 | Ewing | F16B 39/282 411/134 |
| 5,314,279 A * | 5/1994 | Ewing | F16B 39/282 411/134 |
| 5,487,685 A * | 1/1996 | Stillback | F16B 37/061 439/801 |
| 5,833,417 A | 11/1998 | Sargent et al. | |
| 6,343,904 B1 * | 2/2002 | Wang | F16B 31/021 411/162 |
| 6,554,555 B2 * | 4/2003 | Imahigashi | H01Q 1/1214 411/149 |
| 6,749,386 B2 * | 6/2004 | Harris | F16B 39/282 411/150 |
| 6,976,816 B2 * | 12/2005 | Slesinski | F16B 39/103 411/120 |
| 7,073,995 B2 | 7/2006 | Herb | |
| 7,837,353 B2 * | 11/2010 | Mo | H05K 1/0215 362/249.02 |
| 7,922,433 B2 * | 4/2011 | Ricciardo | F16B 39/10 411/119 |
| 8,070,404 B1 * | 12/2011 | Schluter | F16B 39/282 411/368 |
| 8,943,670 B2 * | 2/2015 | Lohr | F16B 39/24 29/525.02 |
| 9,086,088 B2 * | 7/2015 | Walther | F16B 35/065 |
| 9,819,303 B2 * | 11/2017 | Ash | H02S 20/23 |
| 9,841,046 B2 * | 12/2017 | Hess | F16B 37/00 |
| 2001/0022926 A1 * | 9/2001 | Kitayama | F16B 43/001 411/531 |
| 2006/0257229 A1 * | 11/2006 | Bucciferro | F16B 5/02 411/187 |
| 2015/0311606 A1 * | 10/2015 | Meine | F16B 2/12 439/100 |
| 2016/0282016 A1 * | 9/2016 | Ash | F24J 2/46 |

* cited by examiner

FIG. 20

APPARATUS FOR SECURING A SOLAR PANEL RAIL GUIDE TO A SUPPORT BRACKET

BACKGROUND OF INVENTION

Field of the Invention

The present invention relates generally to an apparatus for securing a bracket to a solar panel rail support structure, while providing an electrical bonding path between the bracket and the support structure. More specifically, the apparatus provides a novel and improved nut with a serrated surface in combination with a bolt with an enlarged end like t-bolt with a serrated surface that is capable of penetrating the respective oxidation surface layers of the bracket and the rail guide. The combination is typically used to secure a bracket, and as described herein by way of example, an L-shaped bracket and a flashing cap bracket. An alternate embodiment of the nut also includes rotational and vertical stabilizing features that prevent the nut from moving along the bracket once it is secured. By employing the apparatus at various locations along the roof in a linear fashion, the rail support structure can be properly installed so that an array of solar panel modules to be installed.

An alternate exemplary embodiment of the nut is also provided that includes an alternate way of securing the nut to a bracket such as an L-shaped bracket or a cap bracket used on a flashing.

Description of the Related Art

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. Many of the assembly components require special tools or are generally difficult to install because they are utilized after the solar panels modules are arranged or positioned on their support elements. This is particularly true when the elements must be installed on a roof that links to a rail guide for supporting the solar panel array.

In a typical support rail guide system, solar panel modules are arranged across the top of several rail guides. This typically occurs, for example, by using mounting clamps that join two solar panel modules along the top of the rail guide. The rail guides in turn are supported by flashings that are connected by using a support bracket between the flashing and the rail guide. A typical support bracket is in the shape of an "L", but can be any suitable shape that serves to connect the flashing to the rail guide.

When connecting the support bracket between the flashing and the rail guide, a nut and bolt combination is typically used. The present invention employs a combination bolt with an enlarged end and nut that not only secures the bracket to the rail guide, but also provides an electrical bonding path between the rail guide and the bracket.

Existing solutions are typically limited by their inability to easily and precisely secure the bracket to the rail guide while using extra bonding washers or bonding components, while also creating an electrical bonding path. One example of this is shown in U.S. Pat. No. 7,073,995 issued to Herb. The '995 patent discloses a nut and bolt combination that has an elongated member 4 that can fit in a mounting rail 3. The elongated member has a recessed portion 18.1 and 18.2 that is adapted to receive holding projections 17.1 and 17.2 respectively when screw 8 is tightened into the elongated member. The screw can also have indentations 38 (FIG. 4b), but these indentations are provided solely to engage servo components 33 to form a locking mechanism. The '995 patent does not teach or suggest a combination nut and bolt wherein the bolt has an elongated member such that the elongated member and the bottom surface of the nut include raised portions for penetrating the surface layer of metal objects to create an electrical bonding path between them. The '995 patent also does not disclose that the elongated member of the bolt can be inserted lengthwise in a slot of a solar panel rail guide, engage the rail guide so that raised portions on the elongated member penetrate a surface treatment layer of the rail guide when the nut is tightened, and have the raised portions of the nut engage a bracket that supports the rail guide and penetrate the surface treatment layer of the bracket as well, which creates an electrical bonding path between these objects. The present invention overcomes the limitations of the '995 patent.

The present invention overcomes these limitations and offers a solution that provides a nut and bolt combination that secures a support bracket to a solar panel rail guide slot that creates an electrical bonding path between the rail guide and the bracket that is easy to install, use, and manufacture.

SUMMARY OF THE INVENTION

The invention is summarized below only for purposes of introducing embodiments of the invention. The ultimate scope of the invention is to be limited only to the claims that follow the specification.

It is an object of this invention to provide an assembly for securing a bracket to a solar panel rail guide structure.

It is a further object of this invention that the assembly comprise a bolt that comprises an elongated member on an end of the bolt.

It is a further object of this invention that the elongated member comprises a raised portion capable of penetrating a surface layer of a solar panel rail guide.

It is a further object of this invention that a nut engages an end opposite the elongated member on the bolt.

It is a further object of this invention that the nut comprises a raised portion capable of penetrating a surface layer of a bracket that supports the solar panel rail guide.

It is a further object of this invention that the elongated member be capable of insertion lengthwise along the length of the solar panel rail guide slot such that when the elongated member is rotated when turned by the nut, the elongated member will engage the slot of the rail guide and enable the nut to turn until the support bracket is secured between the nut and the solar panel rail guide.

It is a further object of this invention to provide an orientation alignment element on a flange of the nut that fits in a slot of the support bracket.

It is a further object of this invention that the front surface of the flange of the nut comprise at least one notch that couples to a notch pattern on the support bracket.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
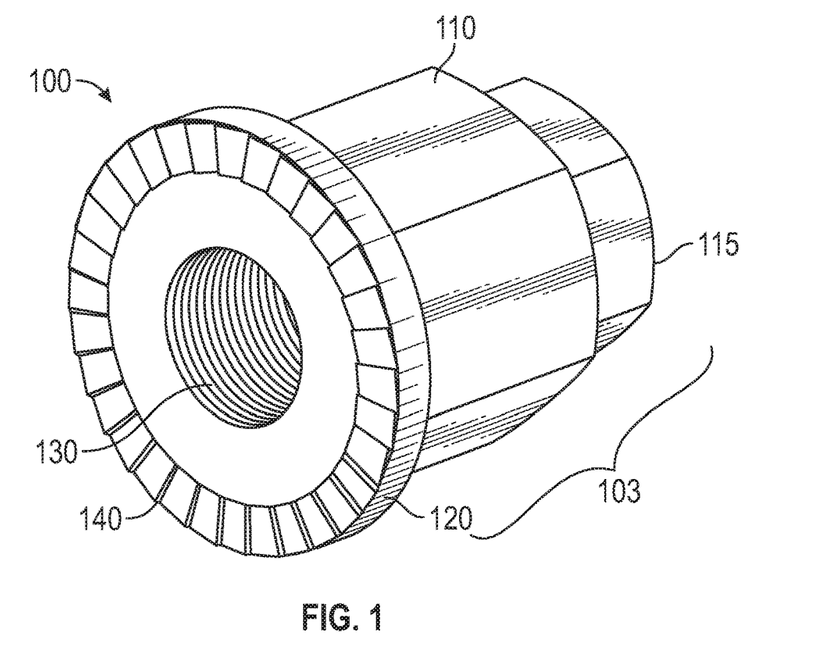
FIG. 1 illustrates a perspective view of an exemplary nut.
Figure 2:
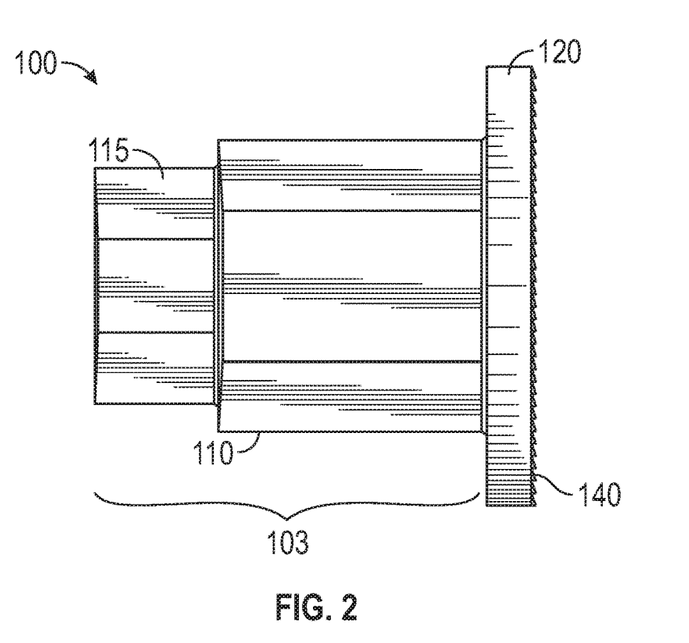
FIG. 2 illustrates a side view of the nut shown in FIG. 1.
Figure 3:
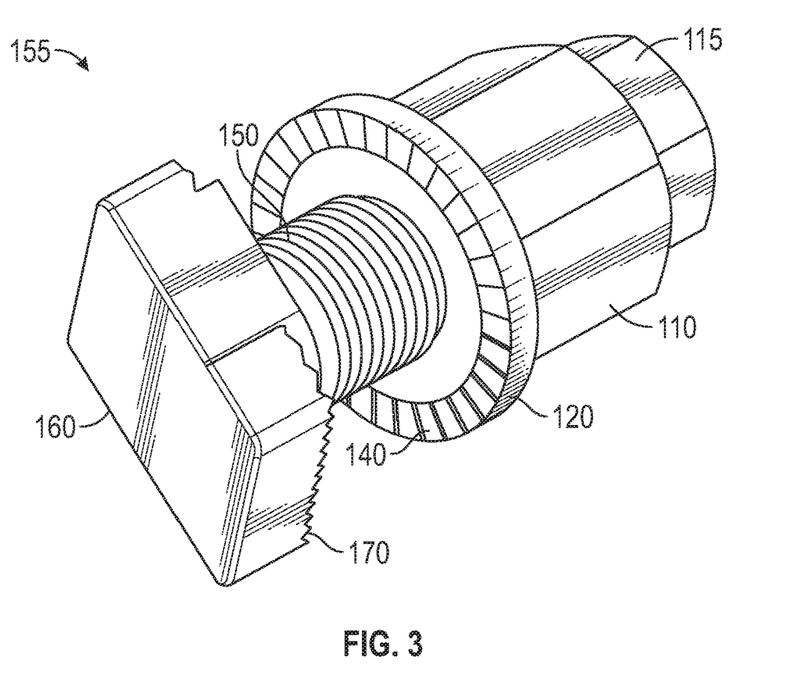
FIG. 3 illustrates a perspective view of the nut shown in FIG. 1 coupled to a bolt with an elongated member.

FIGS. 1 and 2 show perspective and side views respectively of an exemplary embodiment of a nut 100. The nut 100 is typically made of metal or an electrically conducting material. The nut 100 includes head 103. The head 103 shown in this embodiment includes two parts a large hexagonal portion 110, and a smaller hexagonal portion 115 that is to the rear of the larger portion 110. These hexagonal portions 110 and 115 provide a gripping structure for human hands as well as two sizes of socket wrenches or pliers to enable the nut 100 to be turned for tightening or loosening. It is understood by those skilled in the art that the shape of the gripping structure can be hexagonal, or of any suitable shape that provides a secure connection. The nut 100 also includes a female threaded portion 130 for receiving the bolt 155 as shown in FIG. 3. An annular flange 120 is provided on the lower end of the nut 100. The flange 120 is not limited to the annular shape and can also be of any suitable shape. It is also understood that the flange 120 can be the same or greater diameter of the large hexagonal portion 110. The annular flange 120 also includes serrated portions 140 on the bottom surface of the flange 120. The serrated portions 140 can number as few as one, or as many as can be reasonably fit along the surface of the flange 120. The serrated portions 140 should also be as sharp as necessary for them to be able to penetrate a surface layer of a support bracket 300 as shown in FIG. 5 to form a conducting bond between the support bracket 300 and the flange 120.

Figure 4:
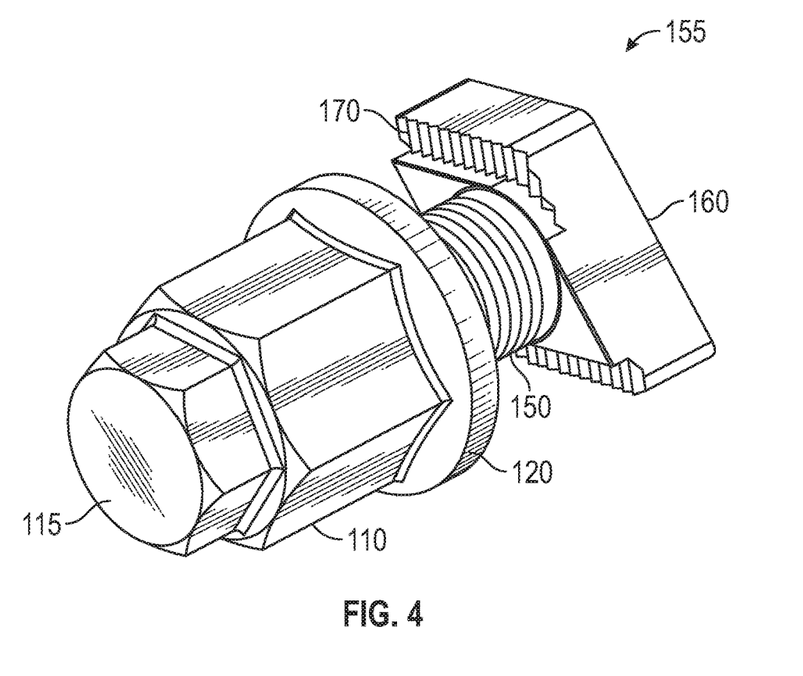
FIG. 4 illustrates a reverse perspective view of FIG. 3.
Figure 6:
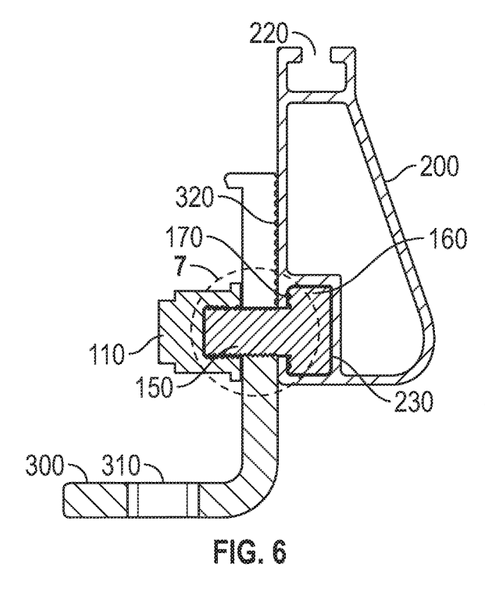
FIG. 6 illustrates a cross-sectional view of FIG. 5 showing the nut and bolt securing the bracket to the solar panel rail guide.
Figure 7:
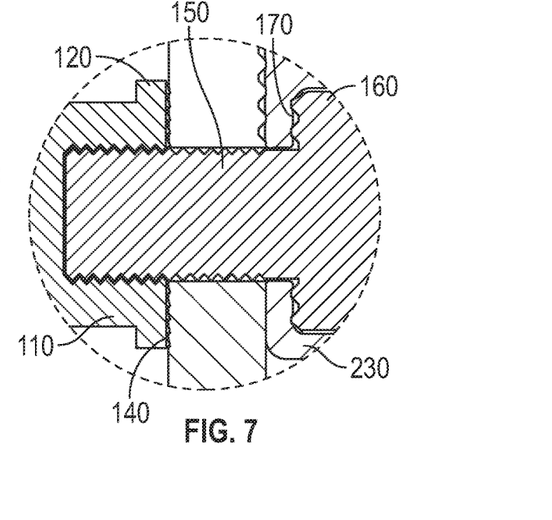
FIG. 7 illustrates a close-up view of the circled area 7 in FIG. 6 showing the raised portions on the nut and bolt penetrating the surfaces of the bracket and solar panel rail guide respectively.

FIGS. 3 and 4 illustrate perspective views of an exemplary combination nut 100 and bolt 155. The bolt 155 is typically what is described as a "t-bolt" and includes a threaded shank 150 that extends outward from one side of an enlarged end 160. The shank 150 and the enlarged end 160 are coupled either in two elements or as a single part. The enlarged end 160 is typically in the shape of a rectangular prism and, along with the shank 150, is electrically conductive. Generally, the size of the enlarged end 160 should allow it to be inserted lengthwise into a slot 230 on the rail guide 200 as will be discussed below in FIGS. 5-7, yet capable of being rotated into a locked position as shown in FIGS. 6-7 so that the enlarged end 160 is substantially perpendicular to the opening of the slot 230. As shown in FIGS. 3-4, the shank 150 is engaged with the nut 100 by screwing it into the female threaded portion 130. On the top surface of the enlarged end 160 where the shank 150 extends outward, a plurality of raised portions 170 are included. These raised portions 170 are generally sharp enough so that they can penetrate the surface layer of an electrically conducting material and create an electrical conducting path between the raised portions 170 and that material. The raised portions 170 can number as few as one. But generally, a greater number of raised portions 170 that are present on the surface create a better electrical conducting path.

Figure 5:
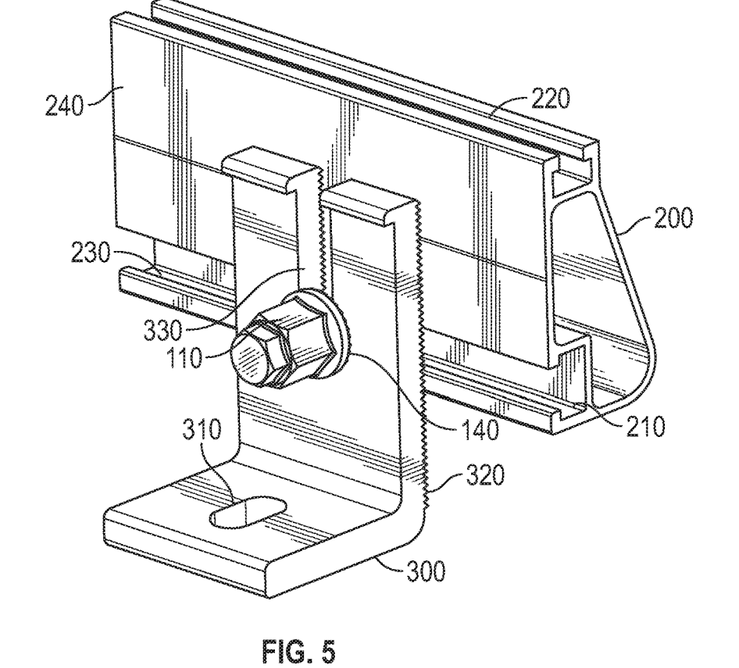
FIG. 5 illustrates a perspective view of a fully assembled exemplary bracket to an exemplary rail guide using the nut and bolt combination shown in FIGS. 3 and 4.

FIG. 5 illustrates an exemplary installation of the assembly. As shown, the rail guide 200 is coupled to the support bracket 300 by way of the nut 100 and bolt 155 combination. The top rail 220 on the rail guide 200 is generally used to support several solar panel modules. A clamp (not shown) fits within the slot of 220 and connects and electrically bonds the modules. Generally, the rail guide 200 extends for a long distance from one end of a roof to another and is supported by multiple support brackets 300 separated by distinct distances apart.

Although the enlarged end 160 can be inserted at the slot end 210, this is not desirable when the rail guide 200 extends for several feet across a roof. For this reason, inserting each enlarged end 160 lengthwise at discrete distances along the slot 230 overcomes this limitation. Once inserted, the nut 100 is then engaged with the threaded shank portion 150 and is typically rotated by hand without the use of extra tools to secure it to the shank 150. As the nut 100 is rotated, the enlarged end 160 rotates inside of the slot 230 and stops rotating when the edges of the enlarged end 160 are perpendicular to, and in contact with the inside surface of the slot 230.

Once the enlarged end 160 is engaged with the inside surface of the slot 230, the support bracket 300 is then inserted between the nut and the face 240 of the rail guide 200 along the aperture 330 and moved into position until a desired height is achieved. The nut 100 is then rotated until the serrations 140 begin to contact the surface of the bracket 300. As the nut 100 is further rotated and tightened, the serrations 140 will penetrate the surface layer of the bracket 300 and the raised portions 170 on the enlarged end 160 begin to penetrate the surface layer of the slot 230 within the rail guide 200 as shown in more detail in FIGS. 6-7. This in turn creates an electrical bonding path between the rail guide 200 and the bracket 300. Gripping features 320 can also provide greater stability for the bracket 300 to further prevent it from sliding up or down when the face of the rail guide 200 once the bracket 300 is secured. When the bracket 300 is electrically coupled to a flashing (not shown) through opening 310, and the rail guide 200 is electrically coupled to solar panel modules along its top rail 220, the solar panel array is fully electrically connected.

Figure 8:
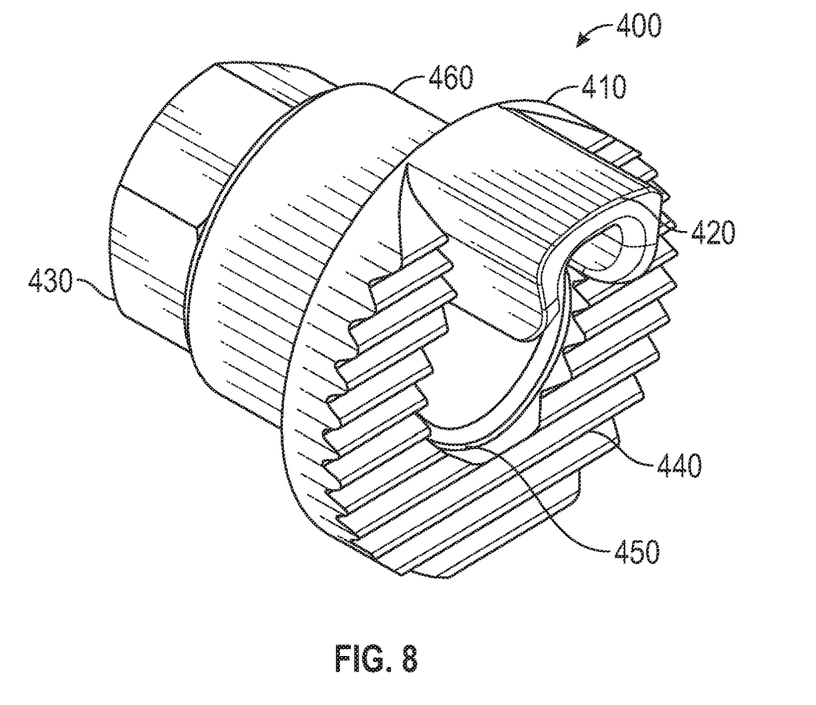
FIG. 8 illustrates a perspective view of an alternate exemplary embodiment of a nut.
Figure 9:
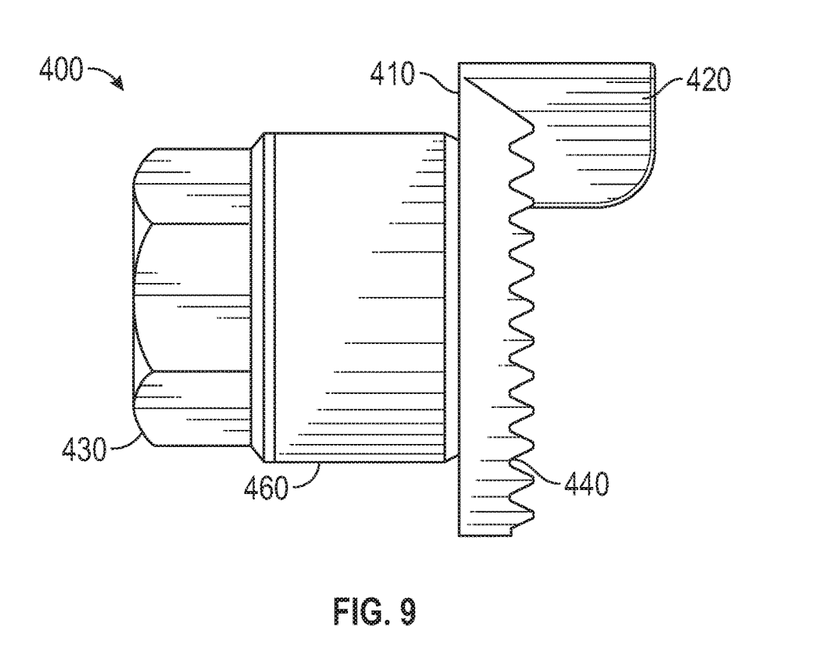
FIG. 9 illustrates a side view of the alternate exemplary nut of FIG. 8.
Figure 10:
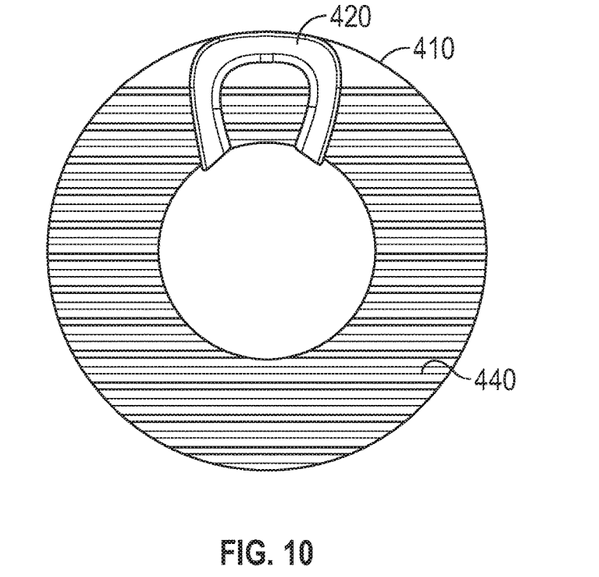
FIG. 10 illustrates a front view of the alternate exemplary nut of FIG. 8.
Figure 11:
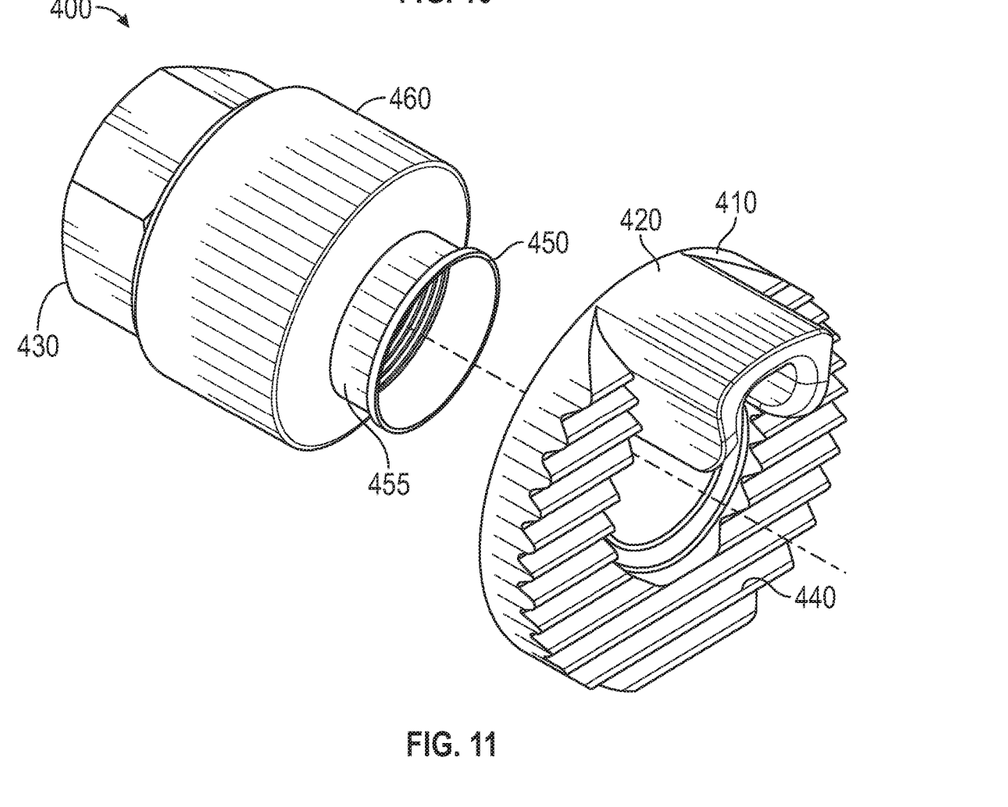
FIG. 11 illustrates an exploded view perspective view of the alternate exemplary nut of FIG. 8.
Figure 17:
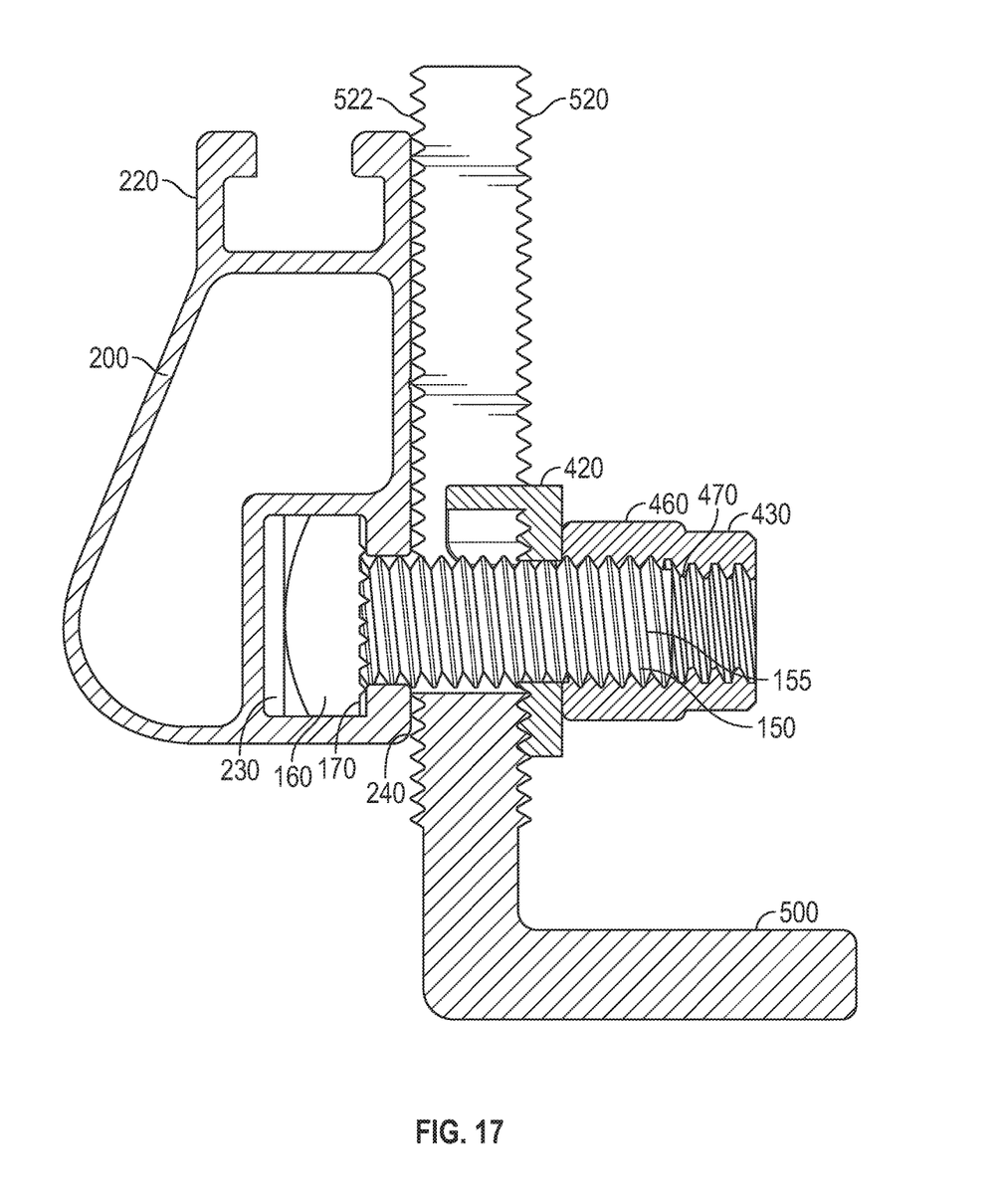
FIG. 17 illustrates a cross-sectional view of FIG. 16 showing the nut and a bolt securing the bracket of FIG. 15 to the rail guide of FIG. 16.
Figure 20:
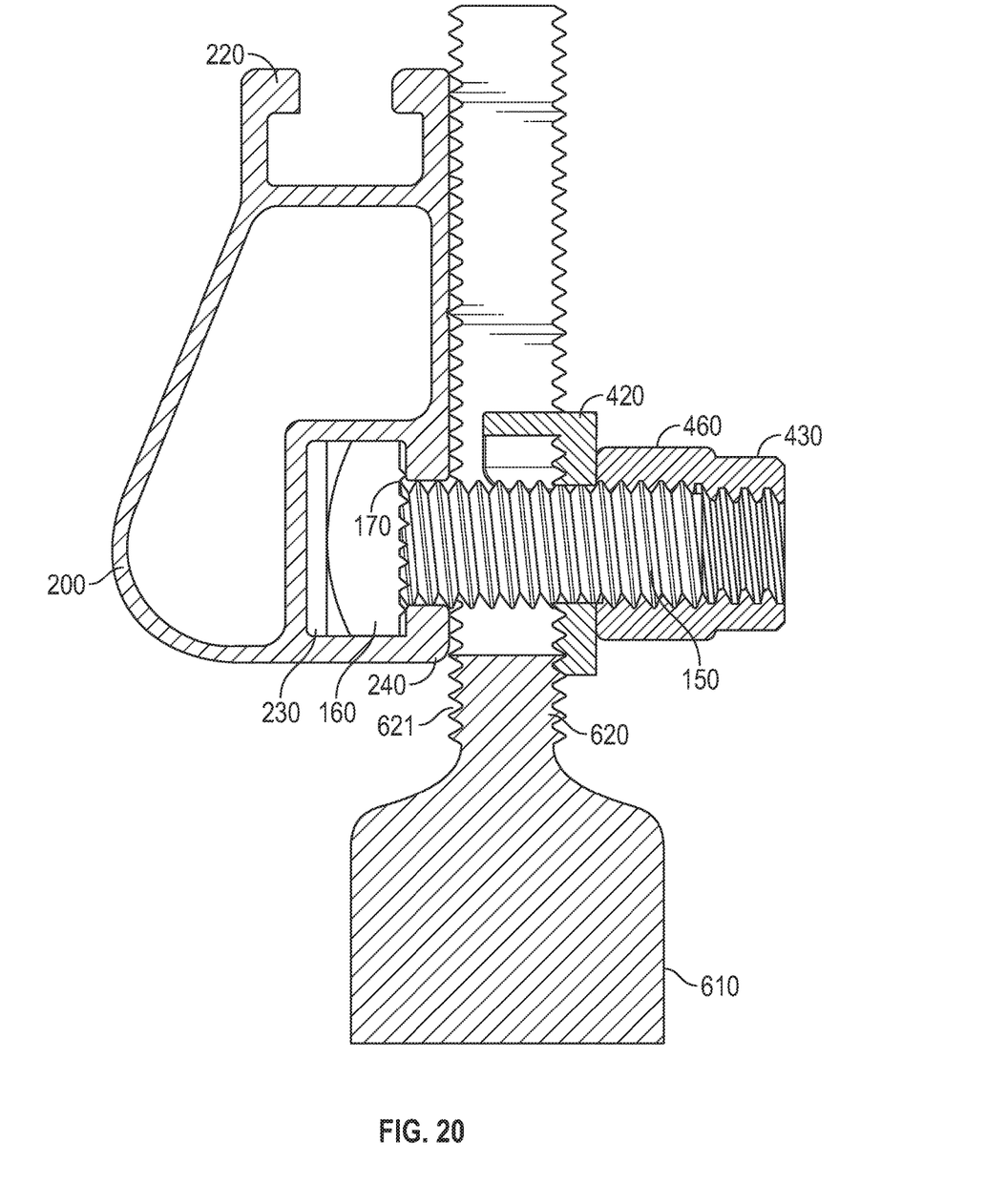
FIG. 20 illustrates a cross sectional view of FIG. 19 showing the nut and a bolt securing the bracket of FIG. 18 to the rail guide of FIG. 19.

FIGS. 8, 9, and 10 illustrate perspective, side, and front views of an alternate exemplary embodiment of the nut 100—now referred to as nut 400, that also provides further stabilization to keep support brackets held in place. The nut 400 is typically made of metal or an electrically conducting material. The nut 400 includes a head 430. The head 430 is typically a hexagonally shaped structure, but it is understood by those skilled in the art that the shape of the structure can be any suitable shape that provides a gripping structure for human hands as well as a socket wrench or pliers to enable the nut 400 to be turned for tightening or loosening. The nut 400 also includes a female cylindrical portion or tube 455 that has an internal threaded portion 470 that extends perpendicularly from the head 430 for receiving the bolt 150 as shown in FIGS. 17 and 20. The cylindrical portion 455 extends through the center of an optional outer washer 460 (as shown in FIG. 11). The outer washer 460 is rotatably coupled to the female cylindrical portion such that the two parts can rotate independent of each other. The outer washer 460 provides a buffer between the head 430 and the annular flange 410 as described below. The outer surface of the outer washer 460 is shown to be smooth, but it can also be hexagonal or any other suitable shape.

Figure 15:
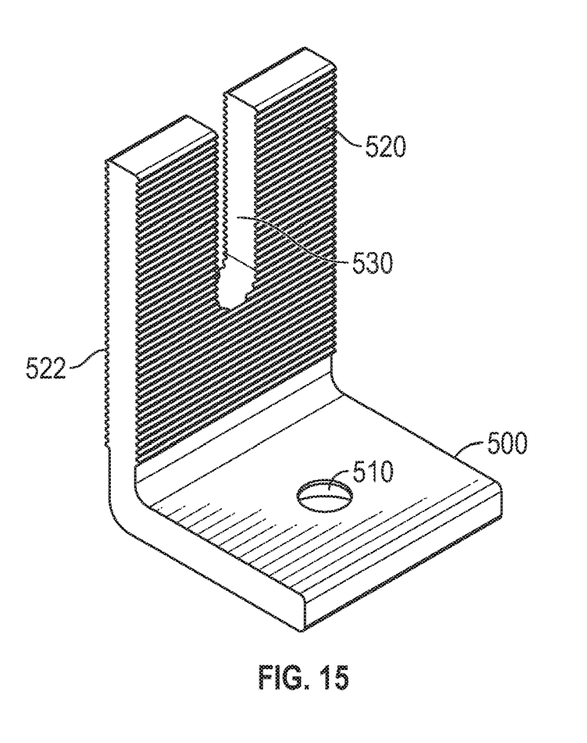
FIG. 15 illustrates a perspective view of an alternate exemplary support bracket.
Figure 18:
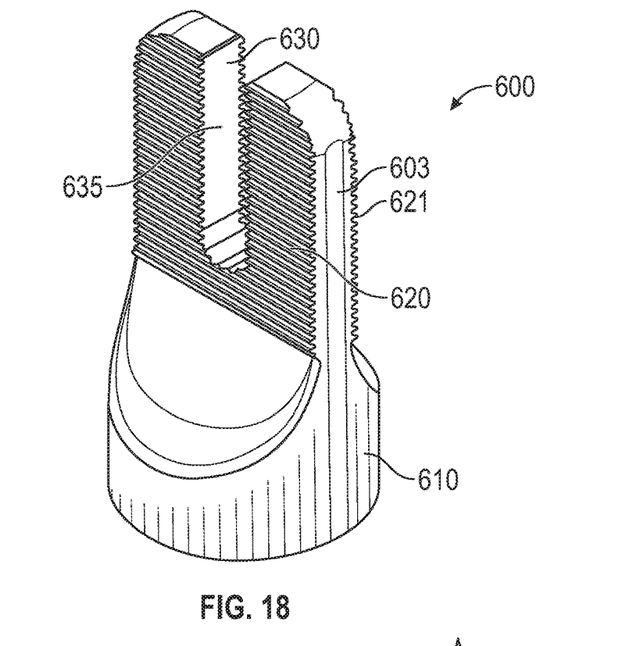
FIG. 18 illustrates a perspective view of an alternate exemplary embodiment of a support bracket for use with a flashing.

An annular flange 410 is provided on the lower end of the nut 400. The flange 410 is not limited to the annular shape and can also be of any shape that provides a suitable surface area to engage a support bracket like that shown in FIG. 15 or 18. The annular flange 410 also includes notches 440 formed by at least two raised portions on the front surface of the flange 410, which typically includes as many notches as necessary to fit or couple with similar notches on a support bracket such as the L-shaped bracket 500 or flashing cap bracket 600 as shown in FIGS. 15 and 18 respectively, and could number as few as one. The coupling of the notches serves to minimize vertical movement of the support bracket and the nut 400. The annular flange 410 also includes an orientation alignment extension 420. The extension 420 typically protrudes perpendicularly outward from the front of the flange 410 as shown. The extension 420 is inserted into the aperture 530 or 635 of the support brackets 500 or 600, which in addition to the coupling of the notches 440 on the flange 410 with the notches on the support brackets 500 or 600, keeps the flange 410 in a stationary position once inserted.

Figure 12:
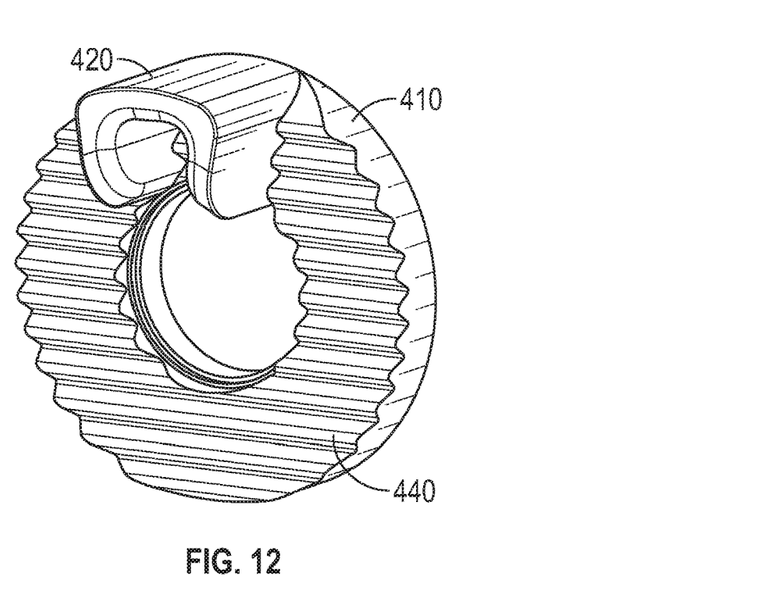
FIG. 12 illustrates a front perspective view of the annular flange of the alternate exemplary nut of FIG. 8.
Figure 13:
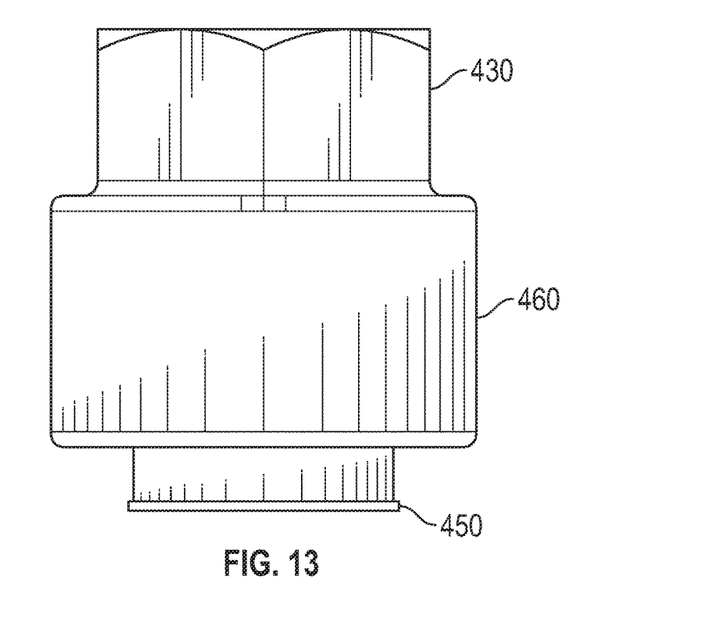
FIG. 13 illustrates a top view of the head of the alternate exemplary nut of FIG. 8.
Figure 14:
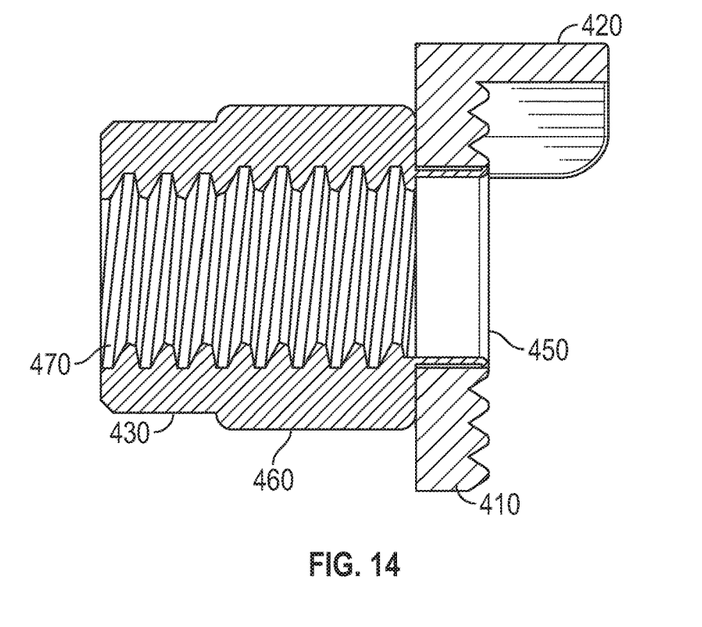
FIG. 14 illustrates a cross-sectional side view of the alternate exemplary nut of FIG. 8.

FIG. 11 shows an exploded perspective view of the nut 400 and illustrates that the end opposite of the head 430 of the nut includes a retention lip 450. The flange 410 is rotatably coupled to the outer surface of the cylindrical portion 455 between the outer washer 460 and the retention lip 450. The retention lip 450 maintains the flange 410 on the cylindrical portion 455 as shown in FIG. 8. The cylindrical portion 455 and the flange 410 may freely rotate independent of each other such as when the head 430 is turned either clockwise or counter-clockwise. FIG. 12 is a front perspective view of the flange 410, FIG. 13 is a top view of the nut 400, and FIG. 14 shows a cross-sectional view of the nut 400 further illustrating the threaded portion 470 of the nut 400, the outer washer 460, the flange 410, the extension 420, and the retention lip 450.

FIG. 15 illustrates an alternate exemplary L-shaped bracket 500 of the L-shaped bracket 300 as shown in FIG. 5. Like the bracket 300, the bracket 500 includes an opening 510 and an aperture 530 with grips 522. The bracket 500 also includes a notch pattern 520 that forms indentations on the front side of the bracket 500. This notch pattern 520 is typically horizontal, but can be any pattern that enables the notches 440 on the flange 410 to couple to each other if they are joined as shown in FIG. 16.

Figure 16:
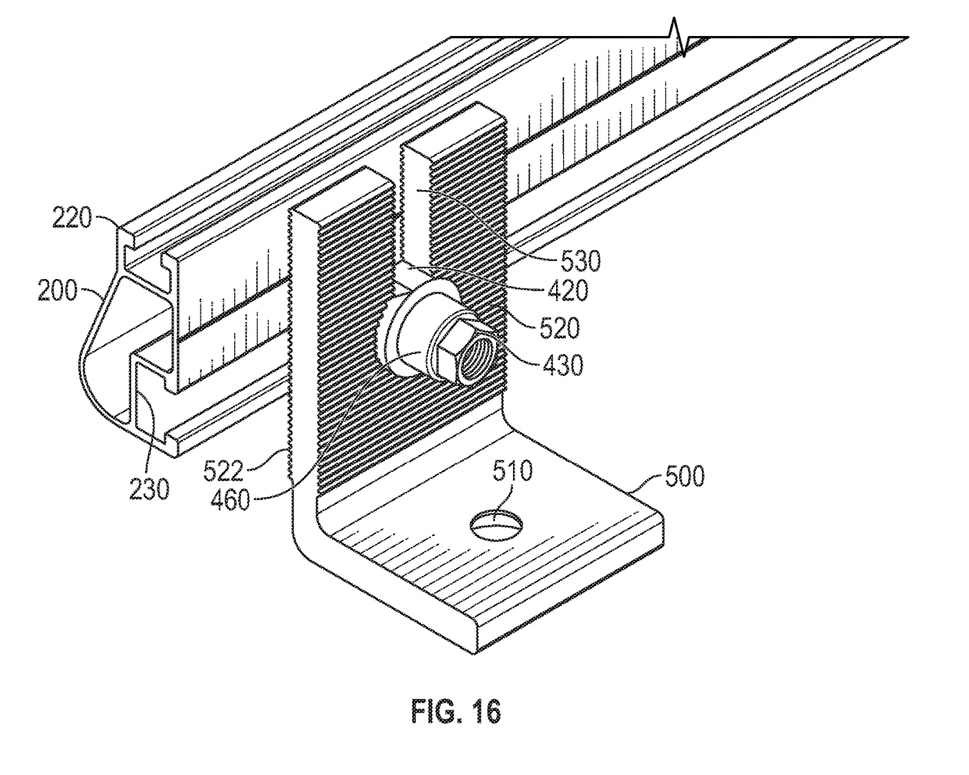
FIG. 16 illustrates a perspective view of a fully assembled alternate exemplary support bracket of FIG. 15 and the alternate exemplary nut of FIG. 8 to a rail guide.

FIG. 16, and the cross-sectional side view of FIG. 17, illustrate a fully assembled product that utilizes the nut 400 to secure the L-shaped bracket 500 to the rail guide 200. In a typical assembly, the L-shaped bracket 500 is secured to a flashing (not shown) by using a bolt through opening 510. The rail guide includes a top rail 220 on the upper portion of the rail guide 200, and a slot 230 on the bottom side of the rail guide 200. The bolt 150, which comprises an enlarged end 160 and the elongated threaded portion 155, is inserted into the slot 230 so the enlarged end 160 is lengthwise. On the top surface of the enlarged end 160 where the shank 150 extends outward, a plurality of raised portions 170 are included. These raised portions 170 are generally sharp enough so that they can penetrate the surface layer of an electrically conducting material and create an electrical conducting path between the raised portions 170 and that material. The raised portions 170 can number as few as one. But generally, a greater number of raised portions 170 that are present on the surface create a better electrical conducting path. The nut 400 is then typically inserted through the aperture 530 of the bracket 500 so that the threaded portion 155 engages the internal threaded portion 470 of the nut 400 through the flange 410. The extension 420 is then inserted into the aperture 530 as shown and the notches 440 are aligned so that they fit within the indentations of the notch pattern 520 on the bracket 500. When this occurs, the flange 410 is essentially locked into place and cannot rotate or move vertically along the aperture 530. The head 430 is then rotated clockwise so that the internal threaded portion 470 becomes rotatably coupled to the threaded portion 155. The rotation enables the enlarged end 160 rotates to a vertical position so that the edges of the enlarged end are locked on the upper and lower portions of the slot 230 and the bolt 150 can no longer rotate. The rotation continues until the nut 400 is tight enough to secure the support bracket 500 to the rail guide 200 and the raised portions 170 on the enlarged end 160 begin to penetrate the surface layer of the slot 230 within the rail guide 200 as shown in more detail in FIGS. 6-7. The grips 522 further stabilize the bracket 500 to the face of the rail guide 200. When the notches 440 and notch pattern 520 are joined, they prevent the vertical movement of the nut 400 with respect to the bracket 500.

FIG. 18 illustrates a flashing cap bracket 600. The Applicant incorporates by reference the flashing cap bracket 600 as described in FIG. 4 of U.S. patent application Ser. No. 15/550,018 filed on Aug. 9, 2017 with a priority date of Jul. 29, 2015. The bracket 600 has a base 610. A typical base is cylindrically shaped as shown, but the base 610 is not limited to a round shape. The base 610 tapers upward and forms a generally U-shaped guide 630 that forms a pair of members 603 extending from opposing sides of the base 610, which in turn forms an aperture 635. Each side of the guide 630 also includes a notch pattern 620 that form indentations on one side, and grips 621 on the other side.

Figure 19:
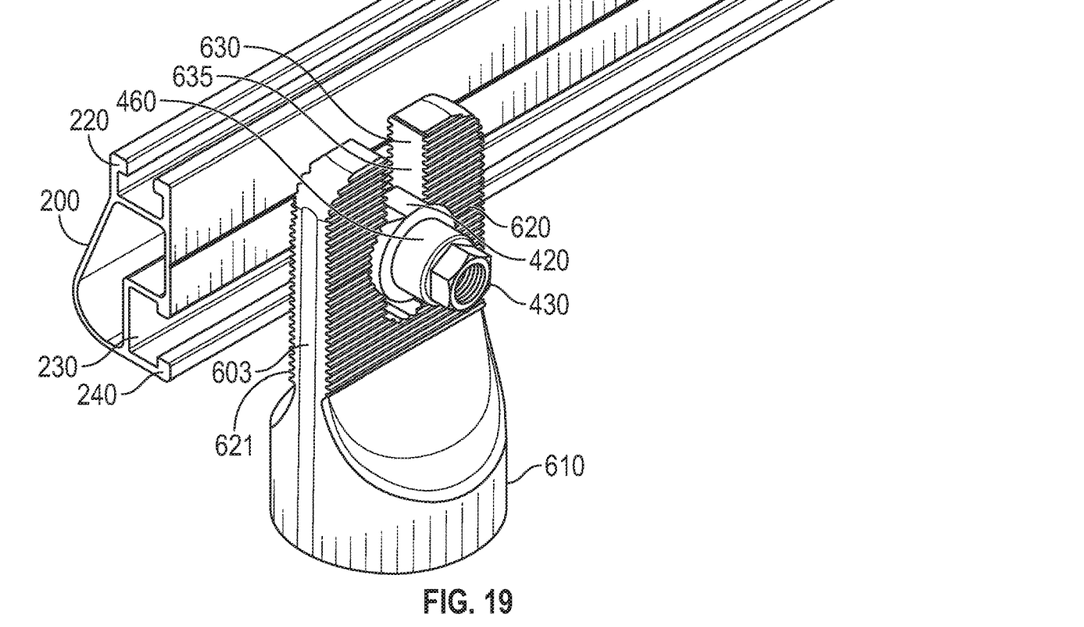
FIG. 19 illustrates a perspective view of a fully assembled alternate exemplary support bracket of FIG. 18 and the alternate exemplary nut of FIG. 8 to a rail guide.

FIG. 19 and the cross-sectional side view of FIG. 20 illustrate a fully assembled product that utilizes the nut 400 to secure the flashing cap bracket 600 to the rail guide 200. The rail guide includes a top rail 220 on the upper portion of the rail guide 200, and a slot 230 on the bottom side of the rail guide 200. The bolt 150, which comprises an enlarged end 160 and the elongated threaded portion 155, is inserted into the slot 230 so the enlarged end 160 is lengthwise. The nut 400 is then typically inserted through the aperture 635 of the bracket 600 so that the threaded portion 155 engages the internal threaded portion 470 of the nut 400 through the flange 410. The extension 420 is then inserted into the aperture 635 as shown and the notches 440 are joined so that they fit within the indentations of the notch pattern 620 on the bracket 600. When this occurs, the flange 410 is essentially locked into place and cannot rotate or move vertically along the aperture 635. The head 430 is then rotated clockwise so that the internal threaded portion 470 becomes rotatably coupled to the threaded portion 155. The rotation enables the enlarged end 160 rotates to a vertical position so that the edges of the enlarged end are locked on the upper and lower portions of the slot 230 and the bolt 150 can no longer rotate. The rotation continues until the nut 400 is tight enough to secure the support bracket 600 to the rail guide 200, and the raised portions 170 on the enlarged end 160 begin to penetrate the surface layer of the slot 230 within the rail guide 200 as shown in more detail in FIGS. 6-7. The grips 621 further stabilize the bracket 600 to the face of the rail guide 200. When the notches 440 and notch pattern 620 are joined, they prevent the vertical movement of the nut 400 with respect to the bracket 600.

What is claimed is:

1. A clamping apparatus for facilitating the completion of an electrical circuit between a solar panel rail guide and a support bracket comprising:
   a. a bolt comprising;
      i. an enlarged end comprising at least one raised portion on a top surface of the enlarged end configured to penetrate a surface treatment layer of a solar panel rail guide;
      ii. a shank having a first end and a second end wherein the first end is coupled to the top surface of the enlarged end so that the shank is perpendicular to the enlarged end;
   b. a nut further comprising:
      i. a head; and
      ii. a cylindrical portion extending outward from the head, the cylindrical portion further comprising an outer surface; and
   c. a flange rotatably coupled around the outer surface of the cylindrical portion at an end of the cylindrical portion opposite the head, the flange further comprising:
      i. a protrusion extending from a front surface of the flange, the front surface further comprising a notch.

2. The clamping apparatus of claim 1 wherein the shank is threaded.

3. The clamping apparatus of claim 2 where in the cylindrical portion is threaded and adapted to engage the threaded shank by rotating the nut around the threaded shank.

4. The clamping apparatus of claim 1 further comprising a washer rotatably coupled to the cylindrical portion between the head and the flange.

5. The clamping apparatus of claim 1 wherein the end of the cylindrical portion further comprises a retention lip for maintaining the flange along the cylindrical portion.

6. The clamping apparatus of claim 1 wherein the cylindrical portion further comprises internal threads.

7. The clamping apparatus of claim 1 wherein the support bracket is a substantially L-shaped bracket.

8. An assembly for facilitating the completion of an electrical circuit between a first and second object comprising:
   a. a solar panel rail guide comprising:
      i. a slot comprising:
         an opening along its length and;
         a surface treatment layer;
   b. a support bracket comprising:
      i. an aperture and;
      ii. a surface treatment layer;
   c. a bolt comprising;
      i. an enlarged end comprising at least one raised portion on a top surface of the enlarged end configured to penetrate the surface treatment layer of the slot of the solar panel rail guide;
      ii. a shank having a first end and a second end wherein the first end is coupled to the top surface of the enlarged end so that the shank is perpendicular to the enlarged end;
   d. a nut further comprising:
      i. a head; and
      ii. a cylindrical portion extending outward from the head, the cylindrical portion further comprising an outer surface; and
   e. a flange rotatably coupled around the outer surface of the cylindrical portion at an end of the cylindrical portion opposite the head, the flange further comprising:
      i. a protrusion extending from a front surface of the flange, the front surface further comprising a notch;
   f. the enlarged end being insertable in a first orientation through the opening along the length of the solar panel rail guide and rotatable to a second orientation such that the enlarged end engages the rail support guide.

9. The assembly of claim 8 wherein the shank is threaded.

10. The assembly of claim 9 where in the cylindrical portion is threaded and adapted to engage the threaded shank by rotating the nut around the threaded shank.

11. The clamping apparatus of claim 8 further comprising a washer rotatably coupled to the cylindrical portion between the head and the flange.

12. The clamping apparatus of claim 8 wherein the end of the cylindrical portion further comprises a retention lip for maintaining the flange along the cylindrical portion.

13. The clamping apparatus of claim 8 wherein the cylindrical portion further comprises internal threads.

14. A method of installing a solar panel rail guide to a support structure comprising the steps of:
   a. Inserting an enlarged end of a bolt into an opening of a slot along a length of a solar panel rail guide wherein the bolt further comprises a shank extending from the enlarged end;
   b. coupling a nut further comprising a flange that further comprises at least one notch on a front surface of the flange to an end opposite the enlarged end of the bolt;
   c. coupling a support bracket, further comprising an aperture and a notch pattern on a side of the support bracket, between the nut and the slot of the solar panel rail guide so that the shank fits through an opening of the support bracket and the notch is coupled to the notch pattern;
   d. inserting an extension on the front surface of the flange of the nut into the aperture on the support bracket;
   e. rotating the nut so that the enlarged end rotates to a position substantially perpendicular to the opening of the slot and engages the slot;
   f. continuing to rotate the nut until the support bracket is secured to the solar panel rail guide.

15. A clamping apparatus for securing a support bracket to a rail guide comprising:
   a. a nut further comprising:
      i. a head; and
      ii. a cylindrical portion extending outward from the head;
   b. a flange rotatably coupled to an end of the cylindrical portion opposite the head, the end of the cylindrical portion further comprising a retention lip, the flange further comprising:
      i. a protrusion extending outward and around a partial portion of a front surface of the flange, the front surface further comprising a notch.

16. The clamping apparatus of claim 15 further comprising a washer rotatably coupled to the cylindrical portion between the head and the flange.

17. The clamping apparatus of claim 15 wherein the cylindrical portion further comprises internal threads.

18. The clamping apparatus of claim 15 wherein the head of the nut is hexagonal.

19. The clamping apparatus of claim 15 wherein the flange is annular.

20. The clamping apparatus of claim 16 wherein the washer is cylindrically shaped.

* * * * *

UNITED STATES PATENT AND TRADEMARK OFFICE
CERTIFICATE OF CORRECTION

PATENT NO. : 10,218,306 B2  
APPLICATION NO. : 15/730807  
DATED : February 26, 2019  
INVENTOR(S) : Ash et al.

Page 1 of 1

It is certified that error appears in the above-identified patent and that said Letters Patent is hereby corrected as shown below:

On the Title Page

Item (72) Inventor is corrected to read:  
-- Jon Ash, Phoenix, (AZ);  
David Taggart, San Carlos, (CA);  
Juan Jimenez, Foster City, (CA) --.

Signed and Sealed this  
Third Day of March, 2020

Andrei Iancu  
*Director of the United States Patent and Trademark Office*